US008533456B2

(12) United States Patent  (10) Patent No.: US 8,533,456 B2
Kholidy  (45) Date of Patent: Sep. 10, 2013

(54) ACCELERATING STREAM CIPHER OPERATIONS USING SINGLE AND GRID SYSTEMS

(75) Inventor: Hesham AbdElazim Ismail Mohamed Kholidy, Pisa (IT)

(73) Assignee: King Saud University, Riyadh (SA)

( * ) Notice: Subject to any disclaimer, the term of this patent is extended or adjusted under 35 U.S.C. 154(b) by 177 days.

(21) Appl. No.: 12/924,978

(22) Filed: Oct. 7, 2010

(65) Prior Publication Data

US 2012/0089829 A1     Apr. 12, 2012

(51) Int. Cl.
  H04L 29/06    (2006.01)
(52) U.S. Cl.
  USPC .......................................... 713/153; 713/165
(58) Field of Classification Search
  None
  See application file for complete search history.

(56) References Cited

U.S. PATENT DOCUMENTS

| | | | |
|---|---|---|---|
| 5,365,588 A | 11/1994 | Bianco | |
| 6,549,622 B1 | 4/2003 | Matthews, Jr. | |
| 6,831,979 B2 | 12/2004 | Callum | |
| 6,963,979 B2 | 11/2005 | Fairclough | |
| 7,043,017 B2 | 5/2006 | Swindlehurst | |
| 7,221,757 B2 | 5/2007 | Alao | |
| 7,277,542 B2 | 10/2007 | Duval | |
| 7,295,672 B2 | 11/2007 | Rarick | |
| 7,403,615 B2 | 7/2008 | Matthews | |
| 7,634,086 B2 | 12/2009 | Kim | |
| 2004/0064688 A1* | 4/2004 | Jacobs | 713/150 |
| 2004/0176023 A1* | 9/2004 | Linder et al. | 455/3.01 |
| 2005/0240764 A1 | 10/2005 | Koshy | |
| 2006/0133616 A1 | 6/2006 | Kim | |
| 2007/0110225 A1 | 5/2007 | Leventhal | |

FOREIGN PATENT DOCUMENTS

| | | |
|---|---|---|
| CN | 101114904 | 1/2008 |
| JP | 2006-200973 | 7/2006 |
| KR | 20000066440 | 11/2000 |
| KR | 20040031924 | 4/2004 |
| WO | 2007/060587 | 5/2007 |

OTHER PUBLICATIONS

Kholidy, H.A., "A New Accelerated RC4 Scheme Using 'Ultra Gridsec' and 'HIMAN' and use this Scheme to Secure 'HIMAN' Data," International Conference on Information Assurance and Security, Aug. 18-20, 2009, pp. 617-622.*
Kholidy, H.A., "Enhanced 'Ultra Gridsec': Enhancing High Performance Symmetric Key Cryptography Schema Using Pure Peer to Peer Computational Grid Middleware (HIMAN)," International Conference on Pervasive Computing and Applications, Oct. 6-8, 2008, pp. 26-31.*
Mousa et al. "Evaluation of the Rc4 Algorithm for Data Encryption," International Journal of Computer Science & Applications vol. 3, No. 2, Jun. 2006, pp. 44-56.*

(Continued)

Primary Examiner — Hadi Armouche
(74) Attorney, Agent, or Firm — Hart IP Law & Strategies

(57) ABSTRACT

Systems and methods for accelerating stream cipher encryption operations are described. In one aspect, a computer-implemented method receives data. The method separates the data into multiple file chunks for compression. A respective compression-encryption instructions header is provided for each compressed file chunk. Each compressed file chunk then is encrypted according to corresponding encryption instructions in the file-chunk's compression-encryption instructions. In one implementation, the compressed file chunks are encrypted by respective worker nodes in a peer-to-peer computing environment. The compressed and encrypted file chunks are merged into a single encrypted-compressed-merged file.

22 Claims, 15 Drawing Sheets

(56) References Cited

OTHER PUBLICATIONS

Kent et al., "IP Authentication Header," RFC 2402, Nov. 1998, pp. 1-23.*
Kent et al., "Security Architecture for the Internet Protocol," RFC 2401, Nov. 1998, pp. 1-62.*
Shacham et al., "IP Payload Compression Protocol (IPComp)" RFC 2393, Dec. 1998, pp. 1-10.*
Dongara, Praveen, et al., "Accelerating Private-Key Cryptography via Multithreading on Symmetric Multiprocessors", 2003, pp. 1-12.
Fluhrer, Scott, et al., "Weaknesses in the Key Scheduling Algorithm of RC4", pp. 1-23, 2001.
Khine, Lae Lae, "A New Variant of RC4 Stream Cipher", World Academy of Science, Engineering and Technology, 2009, pp. 1-4.
Mostafa, Mostafa-Sami M., et al., "Ultra Gridsec: Peer-to-Peer Computational Grid Middleware Security Using High Performance Symmetric Key Cryptography", Fifth International Conference on Information Technology: New Generations, 2008, pp. 1-6.
Poshtkuhi, Alireza, et al., "DotGrid: A.NET-based Infrastructure for Global Grid Computing", May, 2006, pp. 1-8.
Setiawan, Agus, "GridCrypt: High Performance Symmetric Key Cryptography using Enterprise Grids", Grid Computing and Distributed Systems Laboratory Dept. of Computer Science and Software Engineering, The University of Melbourne, Australia, Dec. 7, 2004, pp. 1-9.
Fiskiran, Murat "Fast Parallel Table Lookups to Accelerate Symmetric-Key Cryptography", Apr. 1, 2005.

* cited by examiner

ACCELERATING STREAM CIPHER OPERATIONS USING SINGLE AND GRID SYSTEMS

BACKGROUND

Data encryption is used in many computing environments such as grid-computing systems to convert data (plaintext) into what appears to be random data or random characters (cipher text). The cipher text is difficult to understand or decode without a corresponding key for use during a decryption (or decoding) procedure. The encrypted ciphertext is useful when communicating data in a confidential manner since individuals that do not have the corresponding decryption key generally cannot decrypt or understand the ciphertext. A stream cipher is a particular method of encrypting data in which each bit of the plaintext is sequentially encrypted using one bit of the key.

Grid computing refers to the sharing of multiple computing resources to accomplish various computing tasks, such as data processing, data storage and performing complex data calculations. Grid-computing environments are particularly useful for solving problems that require significant computational resources. The combination of multiple computing resources to solve the problem allows the tasks to be distributed among the multiple computing resources, thereby increasing the speed of solving the problem. The size of a grid-computing environment may vary from a few computing systems located in a common area to a large network of computers distributed across a significant geographic area and connected through multiple data communication networks. Grid-computing environments use a set of software services, commonly referred to as "middleware," to manage the distribution of computing tasks to the various computing resources.

SUMMARY

Systems and methods for accelerating stream cipher encryption operations are described. In one aspect, a computer-implemented method receives data. The method separates the data into multiple file chunks for compression. A respective compression-encryption instructions header is provided for each compressed file chunk. Each compressed file chunk then is encrypted according to corresponding encryption instructions in the file-chunk's compression-encryption instructions. In one implementation, the compressed file chunks are encrypted by respective worker nodes in a peer-to-peer computing environment. The compressed and encrypted file chunks are merged into a single encrypted-compressed-merged file.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

Figure 1A:
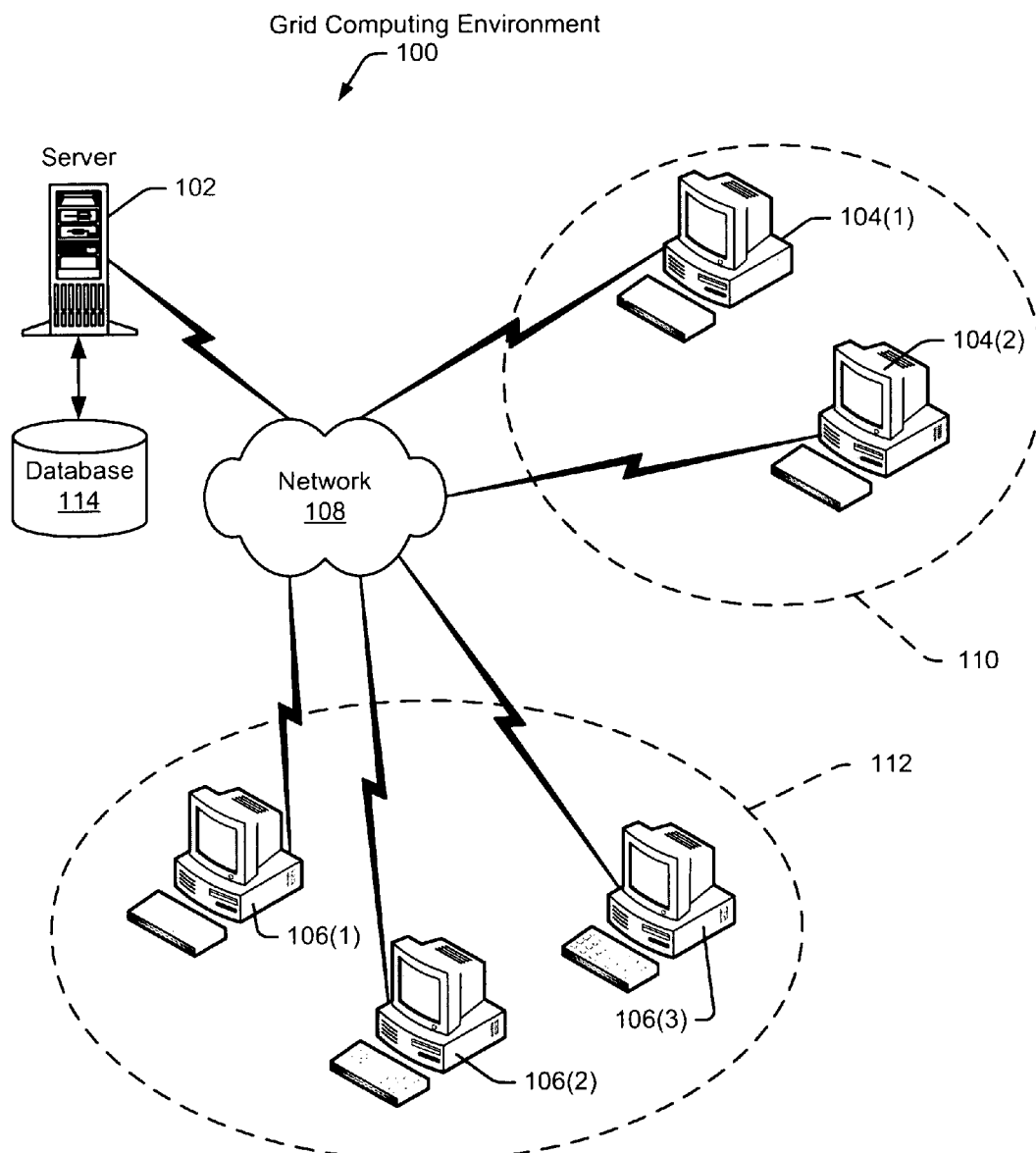
FIG. 1a is a block diagram illustrating an example here to peer computing environment capable of implementing the systems and methods described herein.

Systems and methods for accelerating stream cipher encryption algorithms are described. In one aspect, a system receives data. The input data is separated into plurality of file chunks. Each file chunk is then compressed. A respective compression-encryption instructions header is included to each compressed file chunk. In a peer-to-peer scenario, each compressed data block (or "file chunk") then is communicated using HIMAN Grid Middleware to a respective assigned worker node for encryption according to the corresponding instructions in the received block header. During the encryption process, another encryption header is added to the encrypted block to denote that this block is encrypted using the modified scheme then communicating the encrypted-compressed data block to the client machine, which in turn, merges all encrypted-compressed file chunks to produce the final encrypted-compressed-merged file after adding another header called "Merge-header". In the decryption scenario, the final encrypted-compressed-merged file is split in the client machine using the instruction found in its Merge-header into number of encrypted-compressed chunks. Then each chunk is assigned to a certain worker node to decrypt it using the instruction found in the header of this chunk then send this chunk to the client machine which in turn decompress and merge all the received chunks to produce the final file which should be the same like the original one before encryption and compression. The same operations for encryption and decryption scenarios also applied in a single machine instead of grid computing environment but using multithreading techniques instead of worker nodes, where each thread represents a certain node.

The systems and methods described herein relate to enhanced data encryption, data decryption, and data communication in a computing environment. These systems and methods modify the usage of a stream cipher by dividing the data being processed into multiple data blocks and encrypting the data blocks in parallel as separate processes. This approach supports multiprocessing to enhance the speed of the encryption process. A similar approach is used during a decryption procedure. The described process also enhances utilization of computing resources, disk storage, and communication bandwidth resources in a computing environment, such as a grid-computing environment. When applied to the grid-computing environment, the parallel encryption processes are executed on multiple computing resources within the grid-computing environment instead of multiple threads in the single machine system.

It is highly recommended in cryptanalysis on symmetric key cryptography to use a larger key sizes and complex algorithms to achieve an unbreakable state. However, this leads to an increase in computational complexity specially when applying these complex algorithms inside some Grid Computing middleware, where performance is a major concern in these systems. This has promoted many researchers to develop high performance symmetric key cryptography schemes using approaches such as the use of high-end computing hardware. By utilizing the multithreading and compression techniques, one can improve the performance of symmetric key cryptography and by using grid computing technology; we can get a very high acceleration for these types of algorithms. In grid computing environment, we have two types of data passes inside the grid middleware, one is the block data (e.g., data objects, DLL libraries or images, etc.) and the other is steam text (e.g., codes or program inputs text). Therefore, we need a scheme that encrypts all these types of data without affecting the overall performance of the middleware.

Hesham AbdElazim Ismail Mohamed Kholidy developed before a scheme called "ULTRA GRIDSEC" that can be compatible for grid systems. This compatible scheme supports the block ciphering encryption algorithms (i.e., TDES, DES, AES, and Blowfish) for securing the transferred block data inside grid middleware like HIMAN middleware. The systems and methods described herein introduce the second functionality of this scheme, which is the acceleration of the stream cipher algorithms like the known stream cipher algorithm RC4 that used for securing the stream text data passing inside the grid systems. The RC4 algorithm is accelerated using a single machine to produce the new modified RC4 scheme, which in turn accelerated using "HIMAN" Grid middleware. The new accelerated scheme can be applied inside grid middlewares like HIMAN for securing the stream of text passing between the middleware nodes (i.e., codes, input text data, etc.).

Although particular examples discussed herein relate to grid-computing systems, the present invention can be applied to any type of computing device individually (like the single machine scenario described in FIGS. 3 and 4) or arranged with other computing devices in any configuration (like the grid computing environment scenario described in FIGS. 6, 7, 8 and 9). The encryption procedures, decryption procedures and other data processing techniques described herein are applicable to any type of data being processed or otherwise managed for any purpose, e.g., stream text data like codes and Input text files that pass inside the Grid environments where both Huffman compression technique and stream cipher algorithms give a very effective performance.

An Exemplary System for Encrypting and Decrypting Data

FIG. 1 is a block diagram illustrating an example environment 100 capable of implementing the systems and methods described herein. In a particular implementation, environment 100 is a grid-computing system comprises a peer-to-peer architecture, wherein a server is not needed for execution scheduling processes, only clients and workers (executors), as shown for example in FIG. 2. In this particular implementation, server 102 is shown because it is used to save credentials, profiles, and policies for client and worker authentication and authorizations in environment 100. A database 114 is coupled to server 102 and stores various data, instructions and other information used by, or generated by, server 102. In alternate embodiments, database 114 is connected directly to data communication network 108 instead of, or in addition to, being coupled to server 102. Computing systems 104 and 106 represent respective clients and workers (executors) in the peer-to-peer architecture of environment 100. Computing systems 104 and 106 represent any type of computing device, such as servers, workstations, laptop computers, tablet computers, handheld computing devices, smart phones, personal digital assistants, game consoles, set top boxes, and the like.

In this particular implementation, computing systems 104 and 106 and server 102 communicate via a data communication network 108, such as a local area network (LAN), wide area network (WAN), or the Internet. In particular embodiments, data communication network 108 is a combination of multiple networks communicating data using various protocols across any communication medium. In environment 100, computing systems 104(1) and 104(2) are located in a common geographic location 110 and computing system 106(1), 106(2) and 106(3) are located in another geographic location 112. Geographic locations 110 and 112 may define, for example, individual buildings, campuses or other regions. In alternate embodiments, any of computing systems 104 and 106 may be located in different geographic locations rather than common geographic locations. All the participated machines in Environment 100 have HIMAN client and worker software installed to address the heterogeneity aspects of these machines, e.g., policies, hardware, and operating systems.

Although one server (102) and five computing systems (104 and 106), any number of computing systems can be linked together via any number of data communication networks and/or communication links. In other embodiments, server 102 is replaced with any other type of computing device or replaced with a group of computing devices.

Figure 1B:
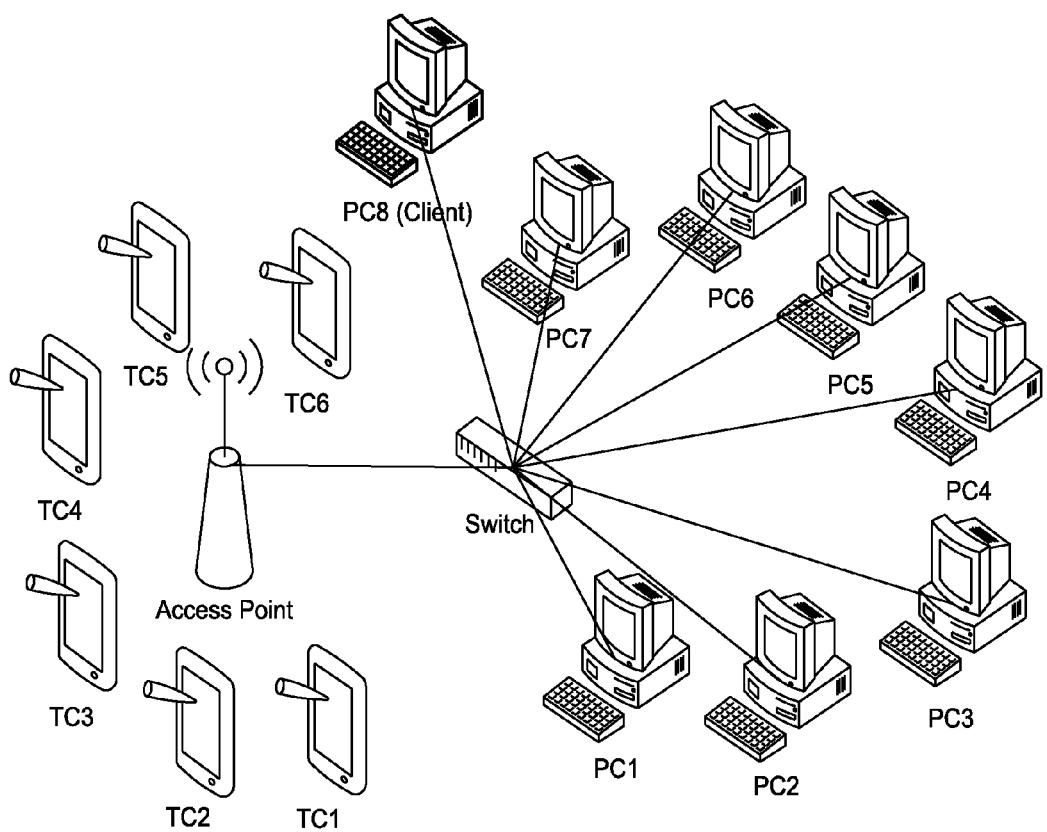
FIG. 1b shows an exemplary HIMAN testbed capable of implementing the systems and methods described herein, according to one embodiment. The term "HIMAN" is an abbreviation for its authors Hisham Kholidy (the current inventor) and Abdelrahman A. Azab.

FIG. 1b illustrates an exemplary HIMAN LAN comprising thirteen workers (PC1 through PC7 and TC1 through TC6) and one client (PC8). Although these effective numbers of workers and a client is shown in this example, there can be any number of workers and clients. In this particular example, the Personal Computers (PCs) are operatively connected to an Ethernet switch, and the Thin Client (TCs) are operatively coupled as respective wireless nodes to an access point. The access point is operatively coupled to the Ethernet switch, as illustrated.

Figure 2:
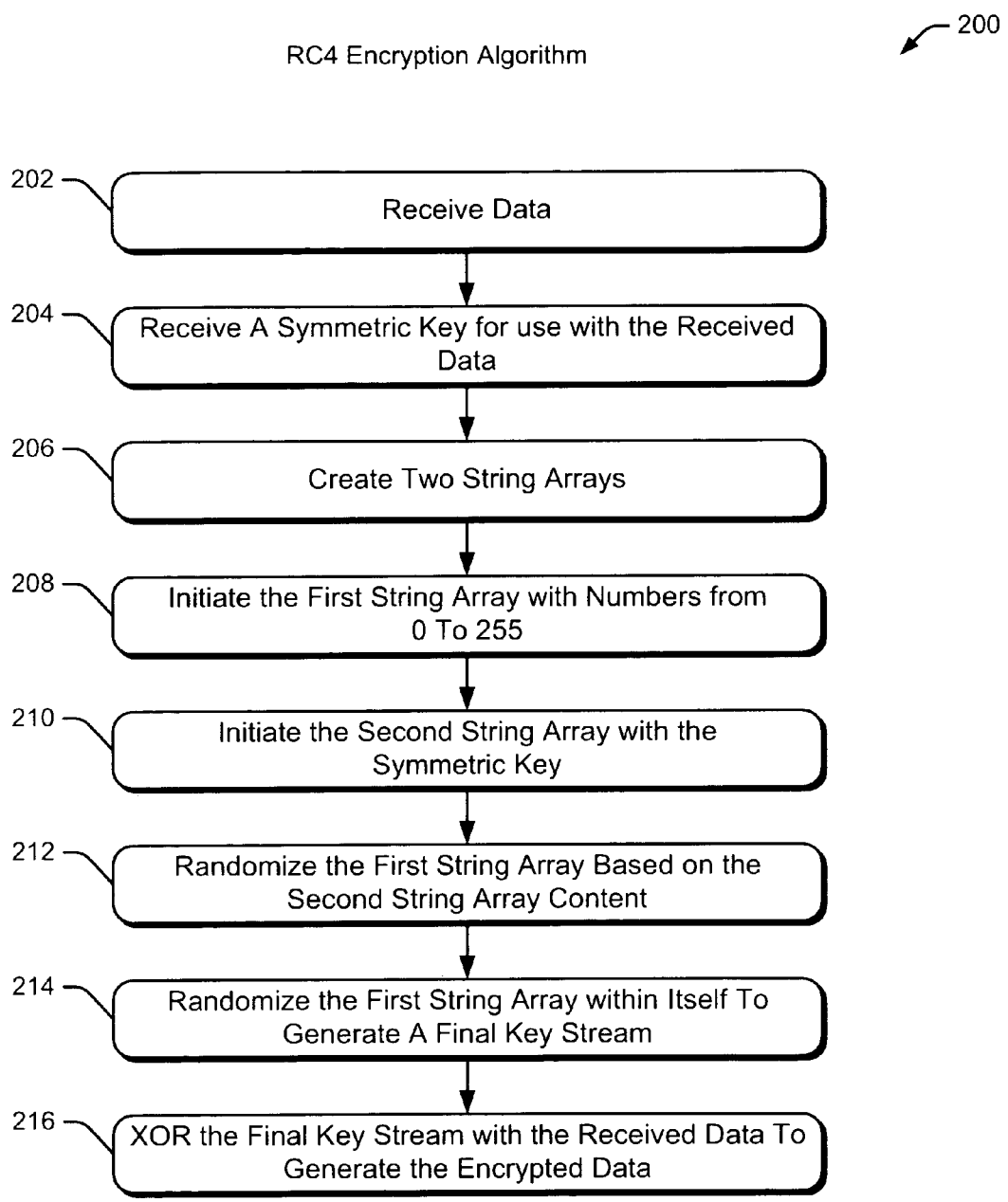
FIG. 2 shows a conventional procedure for encrypting data using the RC4 encryption algorithm, according to one embodiment.

For purposes of exemplary comparison to the novel aspects of the described systems and methods of this description, FIG. 2 shows an example known procedure 200 for encrypting data using the RC4 (Rivest Cipher 4) encryption algorithm, according to one embodiment. The RC4 encryption algorithm is a stream cipher, symmetric key algorithm that is also referred to as "ARC4" and "ARCFOUR". The same algorithm is used for both encryption and decryption procedures as an XOR (Exclusive OR) function applied to the data stream and the generated key sequence. Here, a user provides a symmetric key before starting the encryption process and this done in the client of the grid system (inside the user machine if single is running the new accelerated scheme, which is not part of this figured description). The symmetric key used in the RC4 algorithm is independent of the data (e.g., the plaintext) and is a variable length key ranging from 1 to 256 bits.

Procedure 200 receives data (block 202) to be encrypted and receives a symmetric key for use with the received data (block 204). The procedure continues by creating two string arrays (block 206), each having 256 bits. The string arrays are also referred to as "state tables". The first string array is initialized with numbers from 0 to 255 (block 208). The second string array is initiated with the symmetric key (block 210). The first string array is randomized (using RC4 techniques) based on the content of the second string array (block 212). The first string array is further randomized within itself to generate a final key stream (block 214). The final key stream (or final key sequence) is a pseudo-random stream of bits. The randomization process may be performed with the support of a pseudo-random number generator.

The regular procedures of the RC4 algorithm for dealing with RC4 keys without MD5 hashing functions. However, applying a function to hash keys is very easy and does not affect the architecture of the modified scheme as the RC4 class and its operations are completely isolated from the body of the scheme. The architecture of the resulted files from the new modified scheme is completely different from the regular resulted files of RC4 algorithm described above with respect to FIG. 2 due to the compression and splitting techniques, so this point is also increasing the security of the resulted files. Applying the hashing function is useful to avoid the weak keys problem, so it can be added farther as a small function.

As discussed herein, the decryption process also uses the RC4 algorithm in a similar manner as the encryption process. This is possible since the XOR function is a symmetric operation.

An Exemplary Procedure for Encrypting and Decrypting Data

Figure 3:
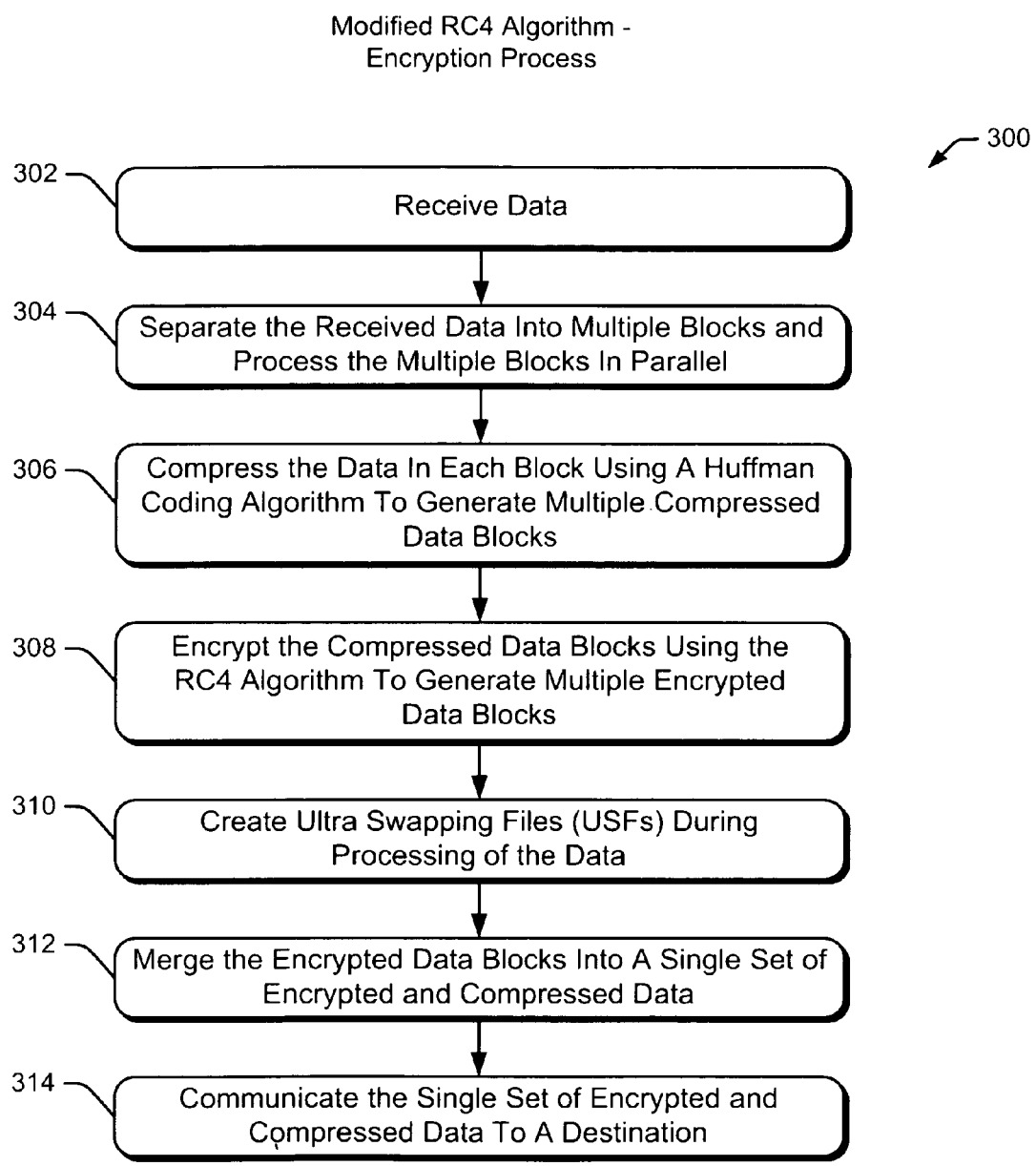
FIG. 3 shows an example procedure for compressing and encrypting data in single machine scenario (see FIG. 4), according to one embodiment.

FIG. 3 shows an example procedure 300 for compressing and encrypting data, according to one embodiment. Initially, data is received (block 302) from a data provider, data storage device or other data source. The received data is separated into multiple blocks such that the data blocks are processed in parallel (block 304), which improves the speed at which the data is processed. This parallel processing allows the multiple blocks to be processed substantially simultaneously. This data processing includes, for example, compressing and encrypting the data as discussed herein.

Data is selected from the original file sequentially and separated into blocks, and number of blocks and block size are calculated according to encryption rate of the used encryption algorithm (e.g., RC4) in terms of number of bytes processed in second. In addition, this rate is affected by the available processing resources of the used (processor, cache memory, and RAM) at the moment of the execution. So data is assigned to each block sequentially by dividing data into number of blocks related to two types of separations which are determined according to the running methodology (i.e., single machine scenario described in FIGS. 3 and 4 or Grid environment scenario described in FIGS. 6, 7, 8, and 9), so we have the following two scenarios:

In a single machine scenario: Number of blocks denotes number of used threads, the best number of threads is determined according to the available processing resources according to heuristic approaches of tries to determine the best block size and accordingly the best number of blocks.

Running in a "HIMAN" Grid environment scenario: Number of block determined according to number of available workers, which will make the encryption/decryption task, and block size is determined according to the processing resources available to the executed worker at the moment of task submission and these parameters are executed using HIMAN Scheduler, added to these parameters, available network bandwidth.

Procedure 300 continues by compressing the data in each block using a Huffman coding algorithm to generate multiple compressed data blocks (block 306). The Huffman coding algorithm is a lossless data compression algorithm. The compressed data blocks are encrypted using the RC4 algorithm to generate multiple encrypted data blocks (block 308). The RC4 algorithm is discussed above with respect to FIG. 2. During the processing of the data blocks (e.g., separating, compressing and encrypting the data blocks), procedure 300 creates one or more Ultra Swapping Files (USFs) to further enhance the processing of the data blocks (block 310). The USFs are used to store processed data to a hard disk drive (or other storage device) temporarily until the data processing is completed, thereby increasing the system memory available for the current processing.

Ultra Swapping Files (USFs) is a methodology that works during a multi threading process. The technique continuously loads each encrypted data block from memory to temporary file in the hard disk, and free this huge location in the memory to be available to another block of data during the multi-threading methodology. After all data blocks are encrypted the scheme writes the temporary encrypted blocks into to the final encrypted output file and delete the temporary files.

After all data blocks are encrypted, the procedure merges the encrypted data blocks into a single set of encrypted and compressed data (block 312). More specifically, each working thread has a thread identifier, which denotes the order of its current processed data block inside the original file. After encrypting each block separately, all data blocks are collected to an array with an index, which depends on the thread identifier for the thread, which processed this data block. This thread identifier also denotes the location of this block inside the original file. Finally, after finishing all the processed threads, we will have an array with ordered encrypted data. Finally, the single set of encrypted and compressed data is communicated to a destination (block 314). The destination may be a storage device, a computing system, or other system that will store, process, or otherwise utilize the data. In examples discussed herein, the encrypted and compressed data is communicated to another computing system in a grid-computing environment.

Figure 4:
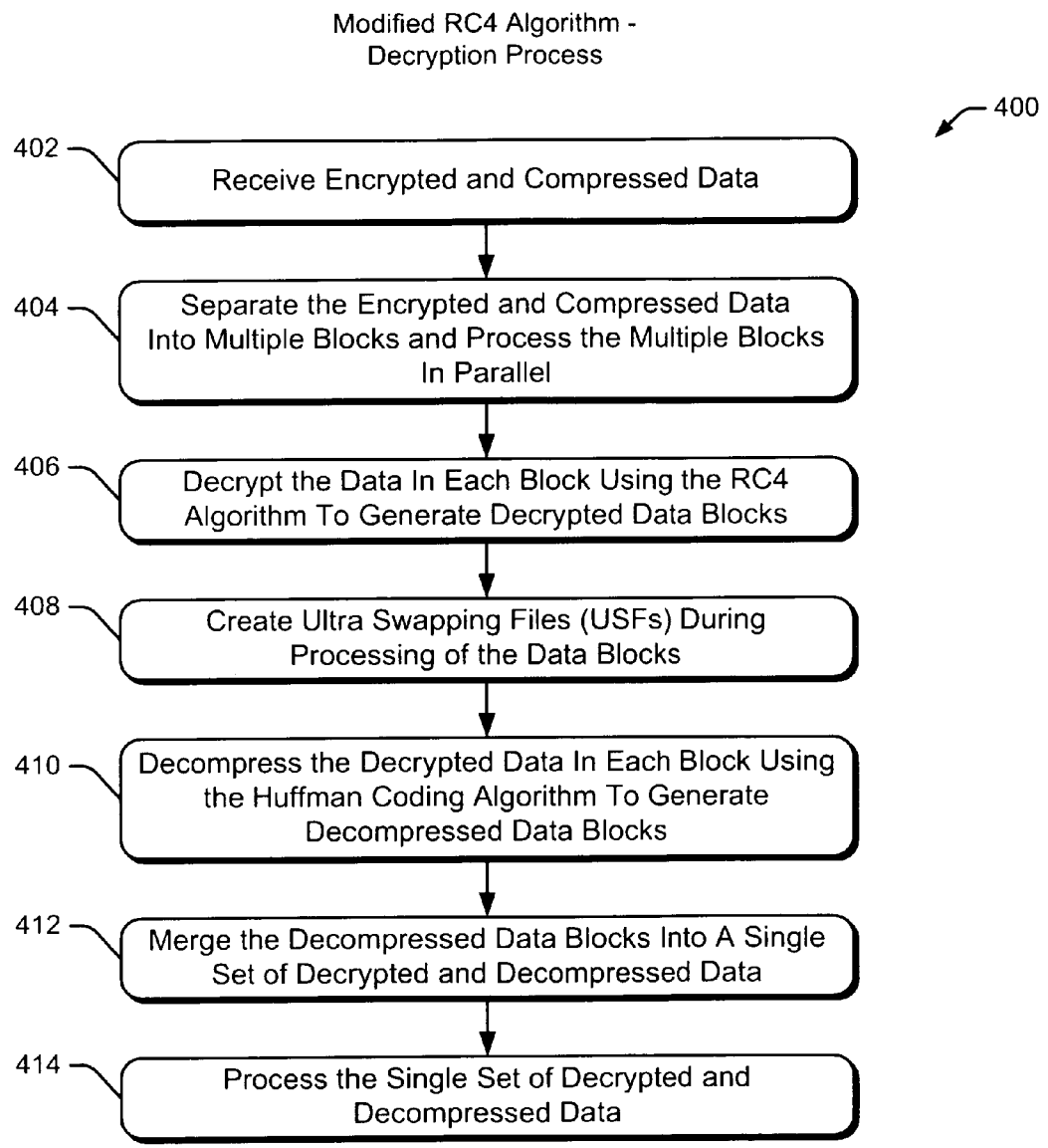
FIG. 4 shows an example procedure for decrypting and decompressing data in single machine scenario (see FIG. 3), according to one embodiment.

FIG. 4 shows an example procedure 400 for decrypting and decompressing data, according to one embodiment. Initially, the procedure receives encrypted and compressed data (block 402), such as the single set of data generated by the procedure described in FIG. 3. The received data is separated into multiple blocks that are processed in parallel (block 404). Separation of the encrypted-compressed data is different from the separation of the plain data (described before for the two used methodologies for single or HIMAN middleware). The difference is related to the Merge header file (Table 1) which is added after merging the compressed and encrypted chunks, so the encrypted-compressed chunks are separated according to the previous mentioned Merge header. For the original plain file, the splitting operation is done according to user selection (in case using single machine scenario) or task description file in Table 6 (in case using the HIMAN Grid Middleware scenario). The procedure decrypts the data in each of the multiple blocks using the RC4 algorithm to generate decrypted data blocks (block 406). As mentioned above with respect to FIG. 3, the procedure creates one or more ultra swapping files to further enhance the processing of the data blocks (block 408).

The decrypted data blocks are decompressed using the Huffman coding algorithm to generate decompressed data blocks (block 410). The decompressed data blocks are then merged into a single set of decrypted and decompressed data (block 412). This single set of decrypted and decompressed data is then processed in a variety of manners (block 414). For example, the decrypted and decompressed data may be stored, communicated to another device, or processed by a local computing system.

Figure 5:
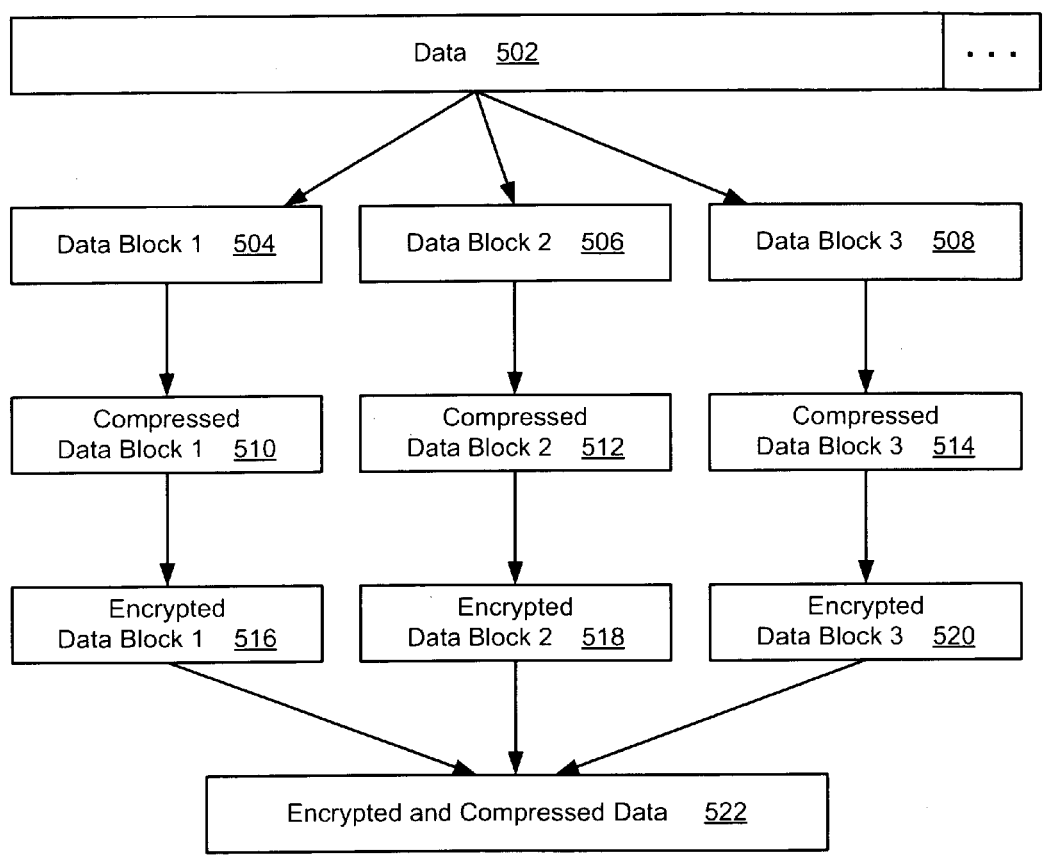
FIG. 5 shows an example separation of data into multiple data blocks and processing the multiple blocks in parallel in single machine scenario (see FIGS. 3 and 4), according to one embodiment.

FIG. 5 shows an example separation of data into multiple blocks and processing the multiple blocks in parallel, according to one embodiment. An initial set of data 502 is received and separated into three data blocks 504, 506 and 508. Data 502 may be part of a larger set of data or a portion of a stream of data. Data blocks 504, 506 and 508 are compressed using the Huffman coding algorithm to produce compressed data blocks 510, 512 and 514, respectively. In a particular example, the initial set of data 502 has a size of approximately 30 MB (megabytes) and each of the data blocks 504, 506 and 508 has a size of approximately 10 MB each. In this example, each of the compressed data blocks 510, 512 and 514 has a size of approximately 5 MB each, resulting from a compression factor of approximately 2:1 by the Huffman coding algorithm.

Compressed data blocks 510, 512 and 514 are encrypted using the RC4 algorithm to produce encrypted data blocks 516, 518 and 520, respectively. In a particular example, each of the encrypted data blocks 516, 518 and 520 has a size of approximately 5 MB each, which is the same size as the compressed data blocks. Thus, the encryption algorithm used in this example does not result in additional compression of the data. The three encrypted data blocks 516, 518 and 520 are merged into a single set of encrypted and compressed data 522. In the example discussed above, the encrypted and compressed data 522 has a size of approximately 15 MB (the sum of the three encrypted data blocks 516, 518, and 520).

An Exemplary Procedure for Encrypting Data in a Grid-Computing System

Figure 6:
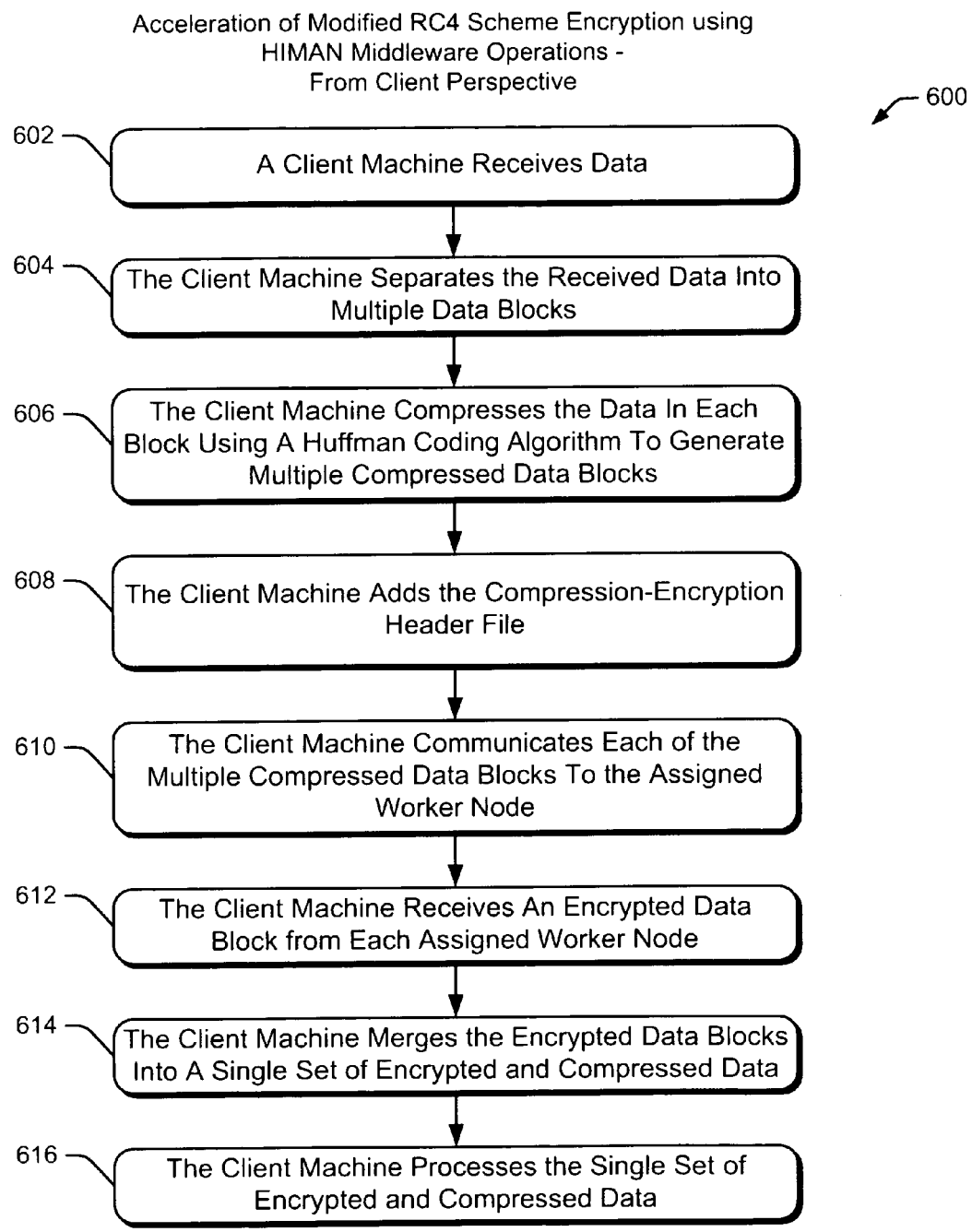
FIG. 6 shows an example procedure for Accelerating modified RC4 encryption using HIMAN middleware operations—from a client perspective, according to one embodiment (in grid environment scenario described in FIGS. 6, 7, 8 and 9).

FIG. 6 shows an example procedure 600 for compressing and encrypting data by a client machine in a grid-computing environment, according to one embodiment. Initially, the client machine in the grid-computing environment receives data (block 602) and separates the received data into multiple data blocks (block 604). This is implemented based on the number of available workers, which will execute the encryption task. The client machine compresses the data in each block using a Huffman coding algorithm to generate multiple compressed data blocks (block 606). The client machine then adds the compression-encryption header file (block 608). For example, header bytes (e.g., 101 bytes) configuring the compression/decompression processes and encryption/decryption processes shown in Table 1. The client machine communicates each of the multiple compressed data blocks to the assigned worker node (block 610). Thus, the worker nodes process the multiple compressed data blocks substantially simultaneously.

After worker nodes have processed (e.g., encrypted) the compressed data blocks, the client machine receives an encrypted data block from each of the assigned worker nodes (block 612). Each encrypted data block is an encrypted version of the compressed data block sent to the assigned worker node. After receiving all of the encrypted data blocks from the worker nodes, the client machine merges the encrypted data blocks into a single set of encrypted and compressed data (block 614)—each block still includes its own respective header (e.g., 101 bytes). Finally, the client machine adds the Merge-Header (shown in Table 1) and saves the final single set of encrypted and compressed data (block 616). At the last step, the client machine deletes the old chunks if this option was selected by the user who makes the encryption task (in case using the single machine scenario) or this option is defined in the task configuration file (in case of using HIMAN System scenario).

Table 1 shows an exemplary header to provide the systems and methods described herein with instructions for separate, merge, compress, decompress, encrypt, and/or decrypt processes. Although the exemplary header shown in Table 1 shows an example bit positions and byte lengths for one implementation, these characteristics can be different in one or more other implementations.

TABLE 1

Exemplary Header for Configuration before Compression and Encryption Processes

| From-To | Length in bytes | Description |
| --- | --- | --- |
| 0 to 19 | 20 | Length of the input file in digits, so it can contain 20 digits (length is stored in serialization format related to some required programming characteristics for storing byte data types) this field is updated after and before the compression of the data. |
| 20 to 27 | 8 | 8 characters as a password for the compression process for securing data from decompressing (this type of compression represents a secure compression process; used in one implementation for moving the compressed data between HIMAN client and workers nodes). |

TABLE 1-continued

Exemplary Header for Configuration before Compression and Encryption Processes

| From-To | Length in bytes | Description |
|---|---|---|
| 28 to 29 | 2 | Reserved for separation between the compression key and decryption key |
| 30 to 53 | 24 | Password For Encryption Key(these bytes are distributed in different way according to the used encryption algorithm so for RC4 or DES they represent the used encryption key and for TDES they divided into 3 passwords for encrypt-decrypt-encrypt (EDE) or encrypt-encrypt-encrypt (EEE) modes) |
| 54 to 57 | 4 | Size of block required for the decompression process for parallelizing the decompression process (size is stored in serialization format related to some required programming characteristics for storing integer values) |
| 58 | 1 | For determining the compress type (e.g., 1 for Huffman and 2 for RLE) |
| 59 to 62 | 4 | Size of block required for the compression process for parallelizing the compression process (size is stored in serialization format related to some required programming characteristics for storing integer values) |
| 63 to 70 | 8 | For encryption block size required for parallelizing the encryption process (size is stored in a serialization format for long data type like (0, 40, 0, 0, 0, 0, 0, 0)) |
| 71 | 1 | For TDES encryption for the two different variant for determining the encryption variant (EDE or EDE), Not required for RC4 |
| 72 | 1 | For determining the encryption type for example 1 for DES, 2 for RC4, 3 for TDES, and 4 for Blowfish |
| 73 to 80 | 8 | For decryption block size for parallelizing the decryption process (size is stored in a serialization format for long data type like (0, 40, 0, 0, 0, 0, 0, 0)) |
| 81 to 82 | 2 | Number of chunks/blocks into which the input file will be divided. In one implementation, this number denotes the available number of worker nodes that will participate in the encryption process according to the HIMAN scheduler decision or user selection process. |
| 83 | 1 | For Header Length |

TABLE 2

Exemplary Header Encryption Information

| | | |
|---|---|---|
| 84 to 91 | 8 | Magic No—Eight bytes number from location 84 to 91 of the header file which indicate that the encryption algorithm used for encrypting this file is my new Modified encryption Scheme and it currently contains this value −235802127 which gives a certain value when it is converted to 8 bytes, so it is an identifier for the files of my new scheme |
| 92 to 95 | 4 | Version |
| 96 to 99 | 4 | Revision |
| 100 | 1 | Increased Bytes (resulted for TDES and DES only; not used for RC4) |

In one implementation, the information in Table 2 is added to the information of the first header after encrypting a file. This additional information (e.g., the new scheme identifier for file that was encrypted, current version of the scheme and so on) provides exemplary information to facilitate the decryption process and prevent the decryption of the file by the regular RC4 algorithm.

In view of the above, the header of a file after compression and encryption using the novel systems and techniques described herein comprises, for example, two structures, each structure respectively shown in Tables 3 and 4.

TABLE 3

Exemplary File Header Structure

Public Structure File_header_Struct
    Public input_file_arr_length( ) As Byte
    Public Compression_Key As String
    Public Encryption_Key As String
    Public DeCompression_Block_Size As Integer

TABLE 3-continued

Exemplary File Header Structure

Public CompressType As Byte
    Public Compression_Block_Size As Integer
    Public Encryption_Block_Size As Long
    Public Encryption_Variant As Byte
    Public Encryption_Type As Byte
    Public Decryption_Block_Size As Long
    Public No_Of_Chunks As Short
    Public Header_Length As Byte
End Structure In this particular implementation, the size of the exemplary File header structure of Table 3 is eighty-four (84) bytes.

TABLE 4

Exemplary Scheme-Encryption-Identifier-Header Structure

Public Structure EncryptHeader
    Dim MagicNo As Long
    Dim Version As Integer
    Dim Revision As Integer
    Dim increased_Bytes As byte
End Structure In this particular implementation, the size of the exemplary Scheme-Encryption-Identifier-Header structure of Table 4 is seventeen (17) bytes to identify the file encrypted using the new modified RC4 scheme. So there are 101 bytes defines both the encryption/decryption and compression/decompression processes.

TABLE 5

Exemplary Merge-Header Structure

Public Structure Final_Compressed_Encrypted_Hearder
   Dim NumberOfChunks As Short
   Dim ChunkSizes( ) As Long
End Structure In this particular implementation, the size of the exemplary Merge-Header structure of Table 5 is added after merging all the Encrypted-Compressed chunks into one file and it helps in splitting the final Merged-Encrypted-compressed file during the decryption phase into its previous chunks.

Figure 7:
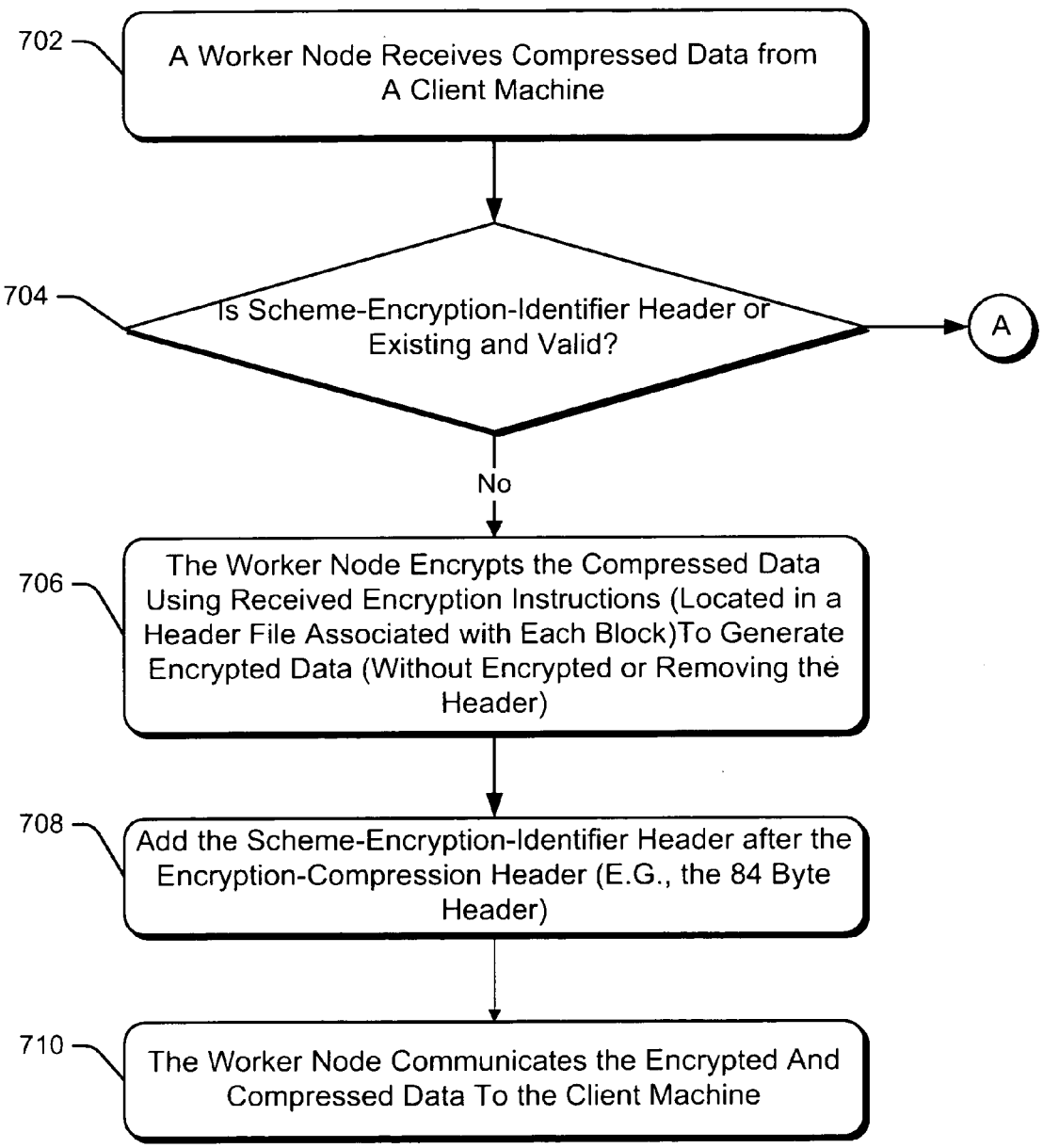
FIG. 7 shows an example procedure for encrypting data received by a worker node from a client machine in a grid-computing environment, according to one embodiment. (In Grid environment scenario described in FIGS. 6, 7, 8, and 9).

FIG. 7 shows an example procedure 700 for encrypting data received by a worker node from a client machine in a grid-computing environment, according to one embodiment. A worker node receives compressed data from a client machine (block 702). Each block of the received compressed data includes a respective header specifying compress/decompress processes and encryption/decryption processes. The data encryption instructions include, for example, a particular encryption algorithm to apply to the compressed data as well as parameters associated with the application of the encryption algorithm to the compressed data. In a particular example, the data encryption instructions identify the RC4 algorithm and instruct the worker node to apply the RC4 algorithm to the compressed data.

After receiving the data encryption instructions, the worker node checks the scheme-encryption identifier better to determine whether it is existing invalid. If so, the procedure continues at block 902 of FIG. 9, as shown by "one-page reference "A." Otherwise, operations continue at block 706, where the worker node encrypts the compressed data using those data encryption instructions (found in the corresponding header—e.g., in the 84-byte header associated with each block) to generate encrypted data. In one implementation, these operations are performed according to the modified RC4 scheme to generate encrypted data. At block 708, the worker node adds a scheme-encryption identifier header (e.g., a 17-byte header) after the encryption-compression header (e.g. 84-bytes). At block 710, the worker node communicates the encrypted and compressed data to the client machine (e.g., via HIMAN). When referring to "encrypted and compressed data" being sent back to the client, it is actually compressed data that has been encrypted in sent back to the client. Each chunk of this data contains the old 84 header followed by the 17-bytes header.

The process for decompressing and decrypting the set of encrypted and compressed data is performed in a similar manner as the procedures described herein. The set of encrypted and compressed data is separated into multiple blocks and distributed to multiple worker nodes for processing. The client machine receives the decompressed and decrypted data blocks from the multiple worker nodes and merges them into a single set of decrypted and decompressed data.

Figure 8:
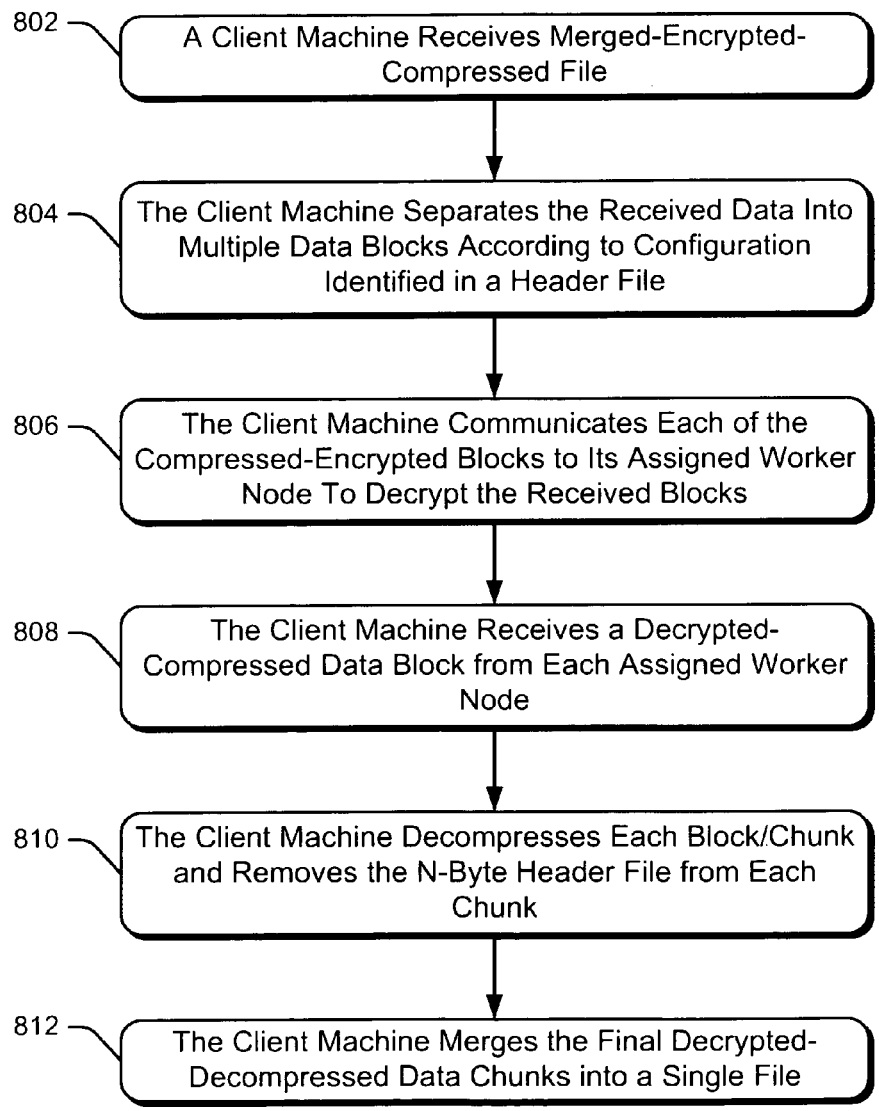
FIG. 8 shows exemplary acceleration of the modified RC4 scheme for decryption using HIMAN middleware operations from a client perspective, according to one embodiment. (In grid environment scenario described in FIGS. 6, 7, 8 and 9).

FIG. 8 shows exemplary acceleration of the modified RC4 scheme for decryption using HIMAN middleware operations from a client perspective, according to one embodiment. At block 802, a client machine receives merged-encrypted and compressed data. Operations of block 804 include the client machine separating the received data into multiple blocks according to a configuration identified in a corresponding Merge-Header (e.g., see Tables 1 and 5). At block 806, the scheme assigns worker IP addresses to each of the Compressed-Encrypted chunks to be sent to its worker node to decrypt the received blocks. Operations of block 808, by a client machine, receive a decrypted-compressed data block from each assigned worker node. Operations of block 810, by the client machine, decompress each received block and remove the header file from each block. Operations of block 812, by the client machine, merges the final decrypted-decompress data blocks/chunks into a single file.

Figure 9:
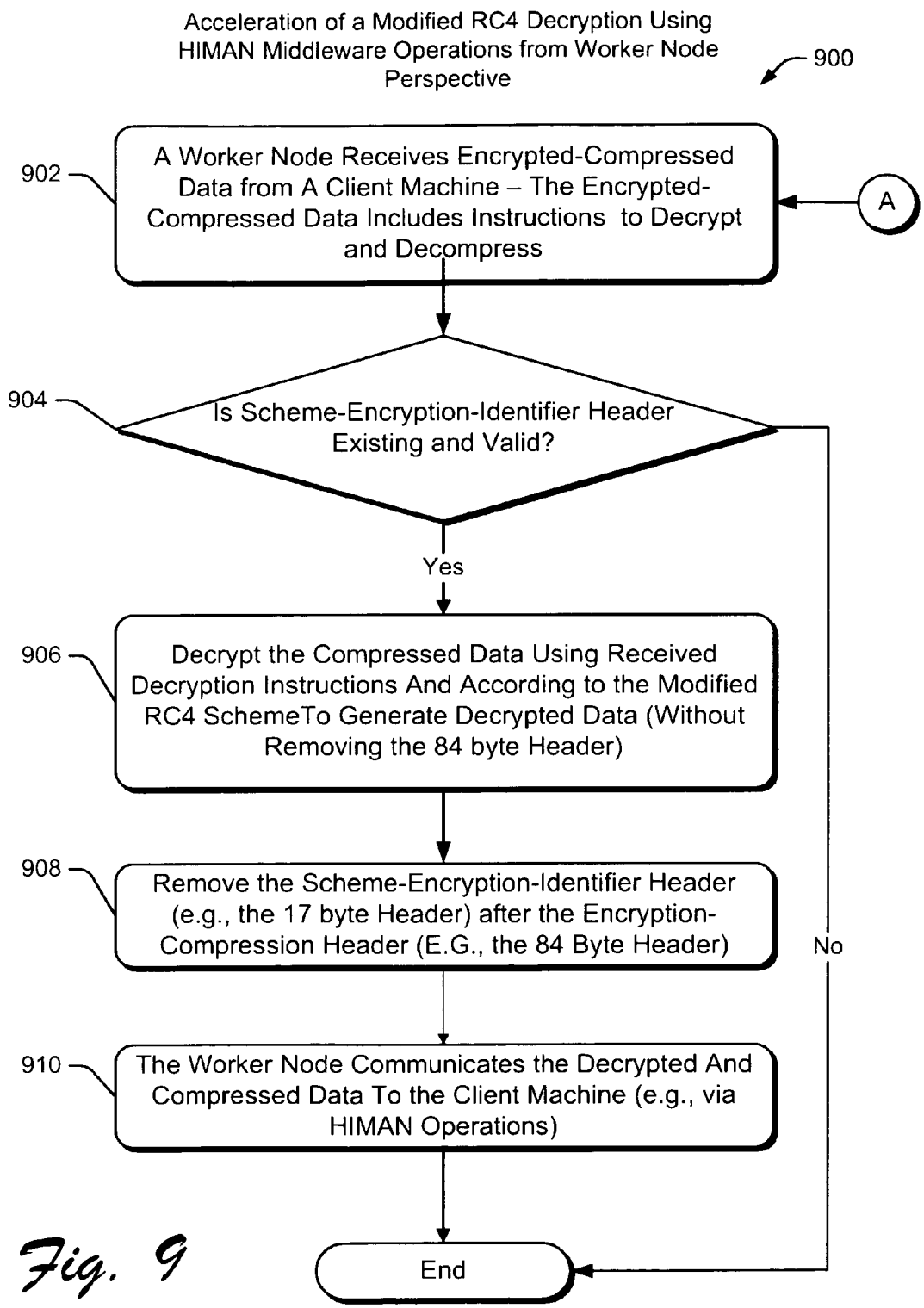
FIG. 9 shows exemplary acceleration of the modified RC4 scheme for decryption using HIMAN middleware operations from a worker node perspective, according to one embodiment. (In Grid environment scenario described in FIGS. 6, 7, 8 and 9).

FIG. 9 shows exemplary acceleration of the modified RC4 scheme for decryption using HIMAN middleware operations from a worker node perspective, according to one embodiment. At block 902, a worker node receives compressed data from a client machine. The compressed data includes a header file describing the decryption and decompression instructions. Operations of block 904 check if the "Scheme-Encryption-Identifier-Header" is existing and valid, and then executes the decryption scenario. If not, the procedure terminates. Otherwise, the procedure continues at block 906 where operations are implemented to decrypt the compressed data using the decryption instructions in the header file and according to the modified RC4 scheme (FIG. 4) to generate decrypted data. This is accomplished without removing the 84 bytes-header. At block 908, the procedure removes the "Scheme-Encryption-Identifier-Header" (e.g., the 17-byte header). At block 910, the procedure communicates the decrypted and compressed data to the client machine (this task done by HIMAN worker node and out of the Scheme operations).

Figure 10:
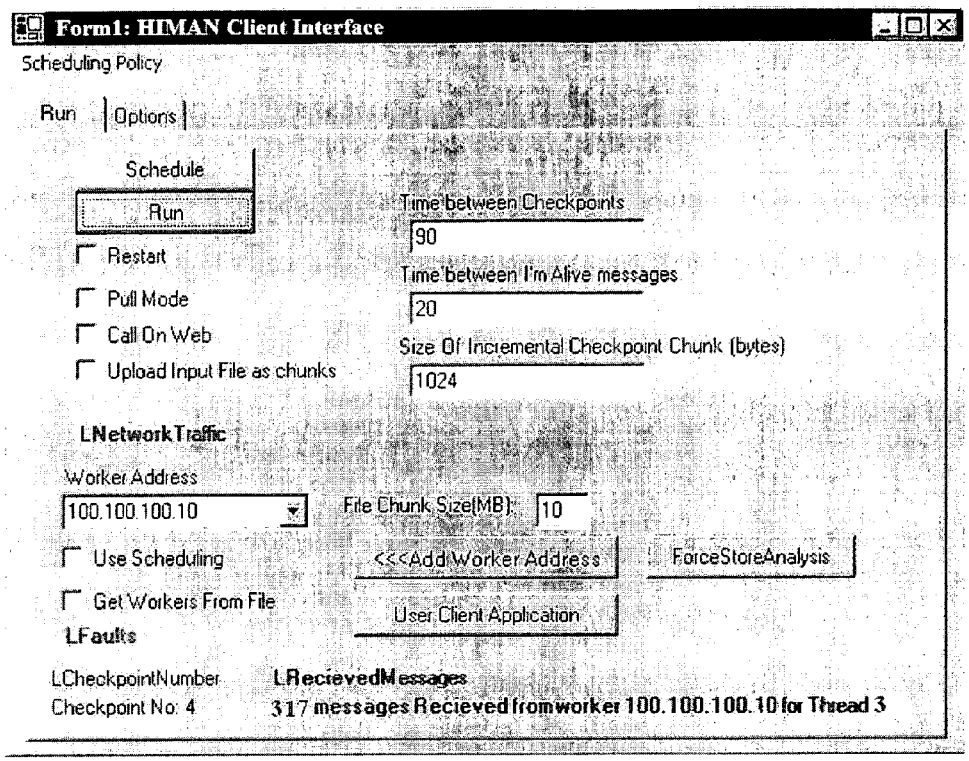
FIG. 10 shows the HIMAN Client user interface used for accelerating Stream cipher encryption algorithm (RC4) according to one embodiment.

FIG. 10 shows an exemplary user interface for the HIMAN client interface during running the new modified scheme, according to one embodiment. As illustrated, the HIMAN client window of FIG. 10 provides for a user to enter a set of configuration options for encryption operations. The client machine produces a configuration file to describe respective tasks of each worker node, including information that describes aspects of the header files for each block/chunk of compressed data. Exemplary such header file is shown in Table 6. All of the operations related to directing or communicating any data between HIMAN client and worker node is completely related to the HIMAN codes and out of the scheme. The encryption and decryption block sizes shown in Table 6 has no effect in the new modified RC4 scheme. As the RC4 is not working like the block ciphering algorithms, as we can define the parameter, number of threads for the scheme directly. So in this case, the scheme will divide the input data into number of blocks according to the available number of threads, otherwise each thread will have more than one block (if block size is defined for the encryption or the decryption methods), however, it has a good effect for the block ciphering algorithms like DES and TDES.

TABLE 6

Exemplary task description file for
submitting tasks to worker nodes

FileName: InputMReference.data
Split Or Merge? yes
Delete Files After Split? (yes/no) yes
Worker(1) IP or Machine Name: 10.0.0.1
Chunk (1) Size (in Bytes): 6118545
Encryption Block (1) in Chunk (1) (Multiplication of 8 bytes): 10240
Worker(2) IP or Machine Name: 10.0.0.2
Chunk (2) Size (in Bytes): 1000000
Encryption Block (2) in Chunk (2) (Multiplication of 8 bytes): 10240
Worker(3) IP or Machine Name: 10.0.0.3
Chunk (3) Size (in Bytes): 2000000
Encryption Block (3) in Chunk (3) (Multiplication of 8 bytes): 10240
Worker(4) IP or Machine Name: 10.0.0.4
Chunk (4) Size (in Bytes): 3000000

TABLE 6-continued

Exemplary task description file for submitting tasks to worker nodes

Encryption Block (4) in Chunk (4) (Multiplication of 8 bytes): 10240
Worker(5) IP or Machine Name: 10.0.0.5
Chunk (5) Size (in Bytes): 4000000
Encryption Block (5) in Chunk (5) (Multiplication of 8 bytes): 10240
Worker(6) IP or Machine Name: 10.0.0.6
Chunk (6) Size (in Bytes): 5000000
Encryption Block (6) in Chunk (6) (Multiplication of 8 bytes): 10240
Worker(7) IP or Machine Name: 10.0.0.7
Chunk (7) Size (in Bytes): 6000000
Encryption Block (7) in Chunk (7) (Multiplication of 8 bytes): 10240
Worker(8) IP or Machine Name: 10.0.0.8
Chunk (8) Size (in Bytes): 7000000
Encryption Block (8) in Chunk (8) (Multiplication of 8 bytes): 10240
Worker(9) IP or Machine Name: 10.0.0.9
Chunk (9) Size (in Bytes): 8000000
Encryption Block (9) in Chunk (9) (Multiplication of 8 bytes): 10240
Worker(10) IP or Machine Name: 10.0.0.10
Chunk (10) Size (in Bytes): 4000000
Encryption Block (10) in Chunk (10) (Multiplication of 8 bytes): 10240
Compression Type:(1 for Huffman and 2 for RLE) 1
Compression Buffer Size in Bytes: 10240
Show Compression Progress Window?(yes Or No) yes
Decompression Buffer Size in Bytes: 10240
Encryption/Decryption Key (24 Characters): 123456788765432112345678
Encryption Variant ?(0 for Null, 1 for EDE and 2 for EEE) 0
Encryption type?(1 for DES, 2 for RC4 and 3 for TDES) 2
Decryption Block Size (Multiplication of 8 bytes): 10240
Number of Threads 3

Figure 11A:
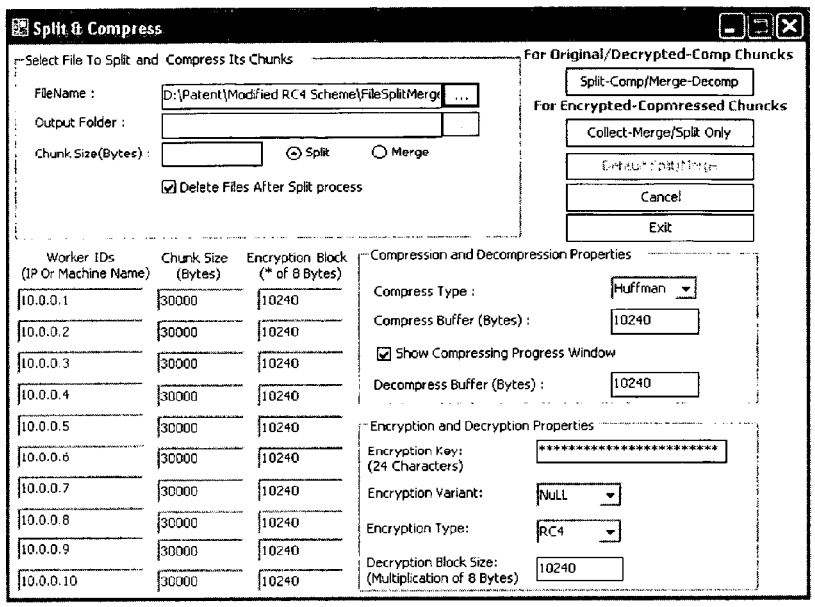
FIG. 11(a, b) shows an exemplary user interface illustrating example aspects of file separating/putting and compressing operations implemented by a HIMAN client and worker machines respectively, according to one embodiment.
Figure 11B:
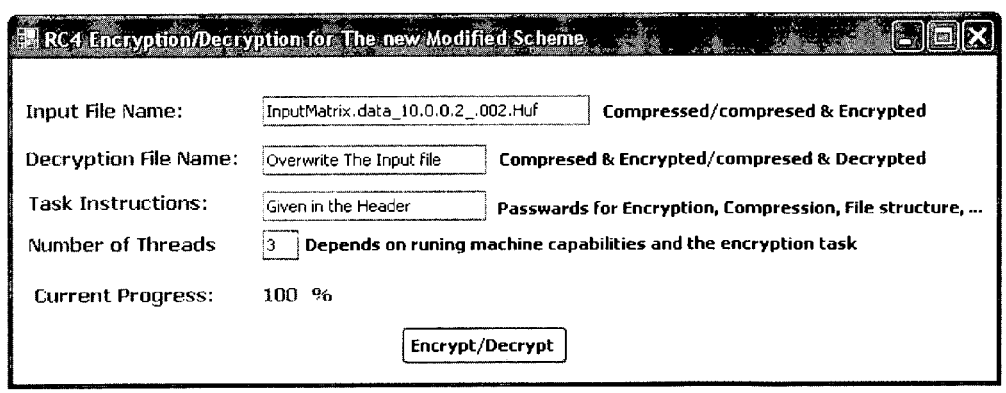

FIGS. 11.$a$ and 11.$b$ show exemplary simulation results for the new enhanced RC4 scheme for the processes done in both client and worker nodes, according to respective embodiments. These user interfaces allow operators to test the scheme without need for the HIMAN client or worker nodes and environment.

Figure 12:
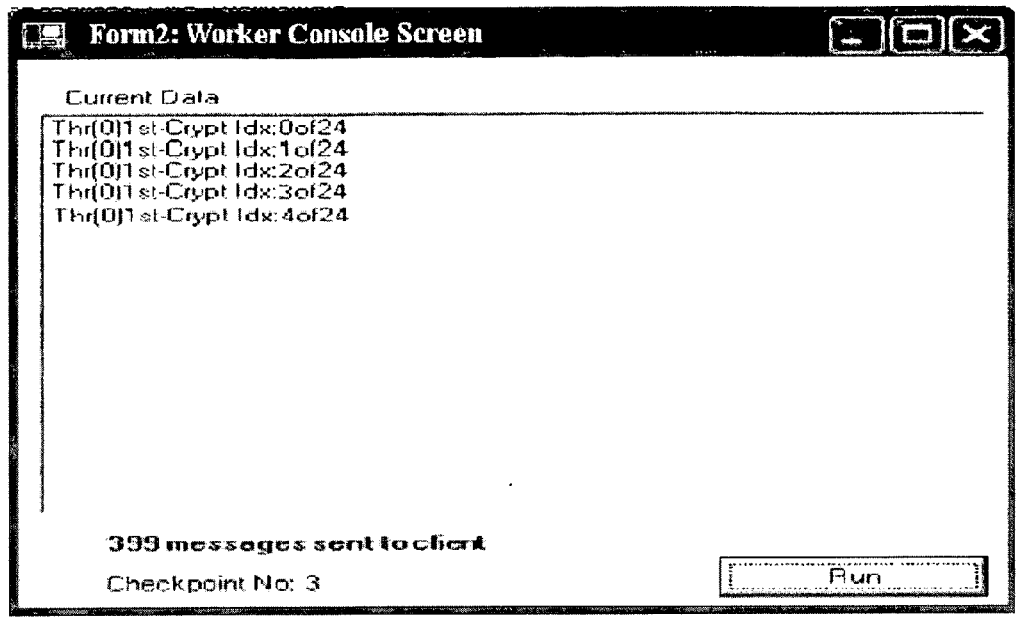
FIG. 12 shows an exemplary console for a HIMAN worker node, according to one embodiment.

FIG. 12 shows an exemplary console for a HIMAN worker node, according to one embodiment. Each client and worker machines in HIMAN environment include and execute both the client and worker software, as any of this machines can be client or worker at any time. Accordingly, FIG. 12 shows the operations running in one of the worker nodes which explain each running thread details which runs inside the worker node processor and the name of the current running methods of the current code (in this case the new modified scheme during encryption).

Figure 13:
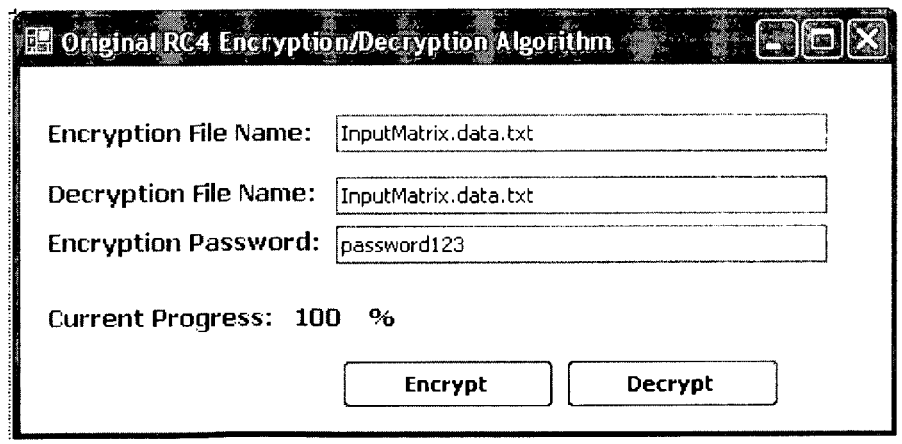
FIG. 13 shows an exemplary user interface used for the original RC4 algorithm.

FIG. 13 shows an exemplary user interface for executing an original RC4 encryption algorithm without any added features of the new modified RC4 scheme.

Figure 14:
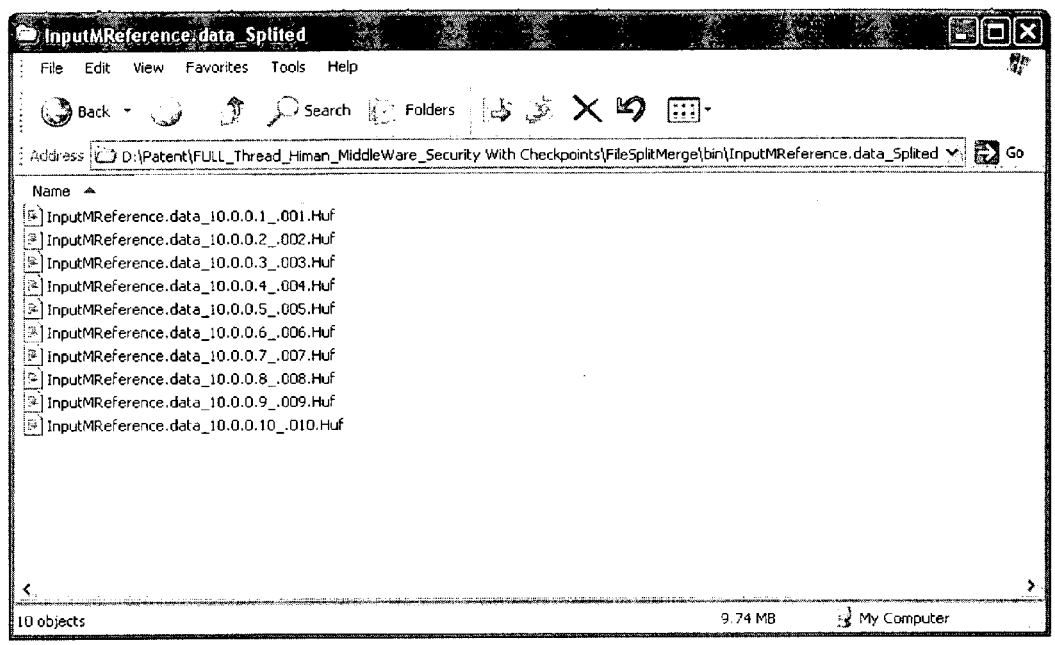
FIG. 14 shows an exemplary user interface for the separated chunks before/after the encryption processes.

FIG. 14 shows an exemplary user interface illustrating example aspects of file separating/putting and compressing operations implemented by the new modified RC4 scheme at client machine, according to one embodiment. In one exemplary implementation, the client machine compresses each chunk and produces a new folder with the same name of the input file then adds to it the suffix "_Splited.". Accordingly, in this example the folder name is "InputMReference.data_Splited." (Different folder and filename conventions can be used.) Inside this folder, the client machine stores all resulting compressed chunks with the same original file name added to it the suffix "IP". Where IP is the IP address for the worker node, which will execute the modified encryption scheme, followed by the suffix "_number" for the order of this chunk inside the original file to reserve the order of the data inside the resulted file during merging after that by the client machine. Then followed by the suffix ".Huf" which denotes that the file is compressed using Huffman code compression algorithm.

During the decryption phase a same file name is overwritten without changing the filename methodology except if user selected another worker nodes for the decryption process, so the worker IP part will only changed. After the client splits a previous Merged-Compressed-Encrypted file, the split chunk files will be stored inside a folder with the name like "InputMReference.data.Enc.Huf.Merg_Split". Where "InputMReference.data" is the original file name. And the part "Enc" indicates that the resulted chunks are encrypted, and "Huf" to indicate that the chunks were compressed using Huffman code algorithm, then "Merge" to indicate that this folder contains the chunks which previously was merged by the client (this is used to differentiate from another folder at the client machine with name "_collected" which contains the collected encrypted-Compressed chunks from worker nodes).

Figure 15:
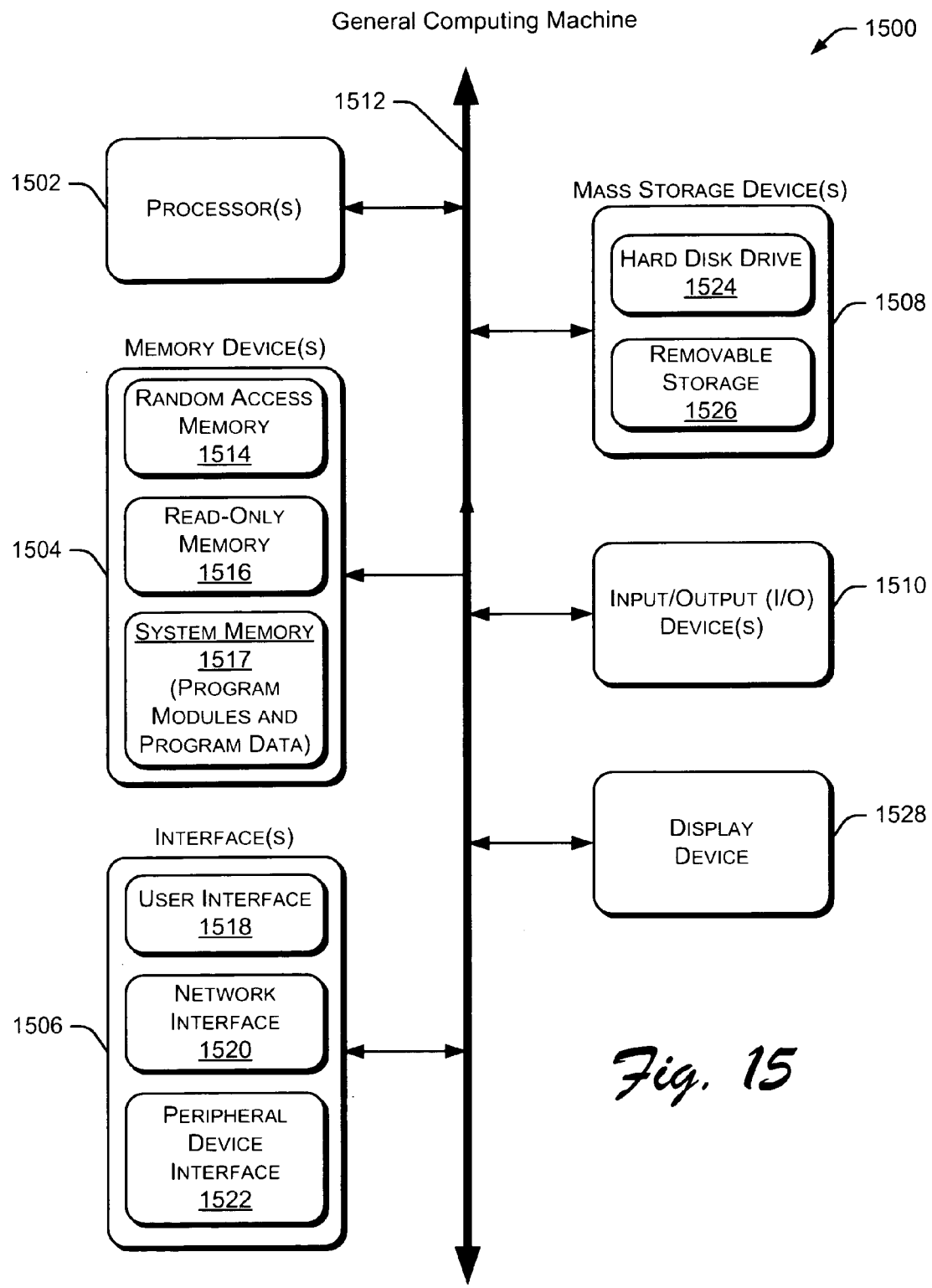
FIG. 15 is a block diagram illustrating an exemplary computing device, according to one embodiment.

FIG. 15 is a block diagram illustrating an exemplary computing device 1500. Computing device 1500 may be used to perform various procedures, such as those discussed herein. Computing device 1500 can function as a server, a client, a worker node, or any other computing entity. Computing device 1500 can be any of a wide variety of computing devices, such as a desktop computer, a notebook computer, a server computer, a handheld computer, and the like. Computing device 1500 includes one or more processor(s) 1502, one or more memory device(s) 1504, one or more interface(s) 1506, one or more mass storage device(s) 1508, one or more Input/Output (I/O) device(s) 1510, and a display device 1528 all of which are coupled to a bus 1512. Processor(s) 1502 include one or more processors or controllers that execute instructions stored in memory device(s) 1504 and/or mass storage device(s) 1508. Processor(s) 1502 may also include various types of computer-readable media, such as cache memory.

Memory device(s) 1504 include various computer-readable media, such as volatile memory (e.g., random access memory (RAM)) 1514 and/or nonvolatile memory (e.g., read-only memory (ROM) 1516) and system memory comprising computer-program modules and program data. Computer-program modules include computer program instructions executable by the processor to perform the operations described herein. Memory device(s) 1504 may also include rewritable ROM, such as Flash memory. Mass storage device(s) 1508 include various computer readable media, such as magnetic tapes, magnetic disks, optical disks, solid state memory (e.g., Flash memory), and so forth. As shown in FIG. 15, a particular mass storage device is a hard disk drive 1524. Various drives may also be included in mass storage device(s) 1508 to enable reading from and/or writing to the various computer readable media. Mass storage device(s) 1508 include removable media 1526 and/or non-removable media.

I/O device(s) 1510 include various devices that allow data and/or other information to be input to or retrieved from computing device 1500. Example I/O device(s) 1510 include cursor control devices, keyboards, keypads, microphones, monitors or other display devices, speakers, printers, network interface cards, modems, lenses, CCDs or other image capture devices, and the like. Display device 1528 includes any type of device capable of displaying information to one or more users of computing device 1500. Examples of display device 1528 include a monitor, display terminal, video projection device, and the like.

Interface(s) 1506 include various interfaces that allow computing device 1500 to interact with other systems, devices, or computing environments. Example interface(s) 1506 include any number of different network interfaces 1520, such as interfaces to local area networks (LANs), wide area networks (WANs), wireless networks, and the Internet. Other interfaces include user interface 1518 and peripheral device interface 1522. Bus 1512 allows processor(s) 1502, memory device(s) 1504, interface(s) 1506, mass storage device(s) 1508, and I/O device(s) 1510 to communicate with one another, as well as other devices or components coupled to bus 1512. Bus 1512 represents one or more of several types of bus structures, such as a system bus, PCI bus, IEEE 1594 bus, USB bus, and so forth.

For purposes of illustration, programs and other executable program components are shown herein as discrete blocks, although it is understood that such programs and components may reside at various times in different storage components of computing device 1500, and are executed by processor(s) 1502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

CONCLUSION

In view of the above, the systems and methods described in this specification use-multithreading techniques for the new scheme (in case of single machine scenario) or multi-programming techniques (in case of grid environment) increase the speed of the scheme, especially for large amount of input data. The new modified scheme can be used to accelerate most of the stream cipher algorithms like: A5/1, A5/2 and FISH, as the code of the original stream cipher algorithm is in a separated class allowing for other algorithms to overwrite this class only.

These described systems and methods for the new modified RC4 scheme allow for use the Grid or Cloud computing technologies, as the encryption process can be divided into a set of small processes run in different machines. The security of the resulted compressed-Encrypted file of the new scheme is more powerful than the regular encrypted RC4 files. This is because of the compression process which done using a password. Regarding security, the described systems and methods implement a scheme that encrypts each block separately with a secrete key. This is more powerful than encrypting the entire file in one time using RC4. Stream cipher algorithms, in general (where RC4 is one of them), use each previous encrypted block for encrypting the next block. In contrast, the novel modified scheme of this description deals with each block/chunk as a standalone file for both encryption/decryption and compression/decompression processes.

The compression technique available in the scheme through Huffman algorithm which is specialized for the stream text which inputs to the scheme, achieve a high ratio of compression, this high ratio helps in saving disk storage, communication bandwidth, cache memory, and processing power.

Although the systems and methods for enhanced data encryption and data communication in a computing environment have been described in language specific to structural features and/or methodological operations or actions, it is understood that the implementations defined in the appended claims are not necessarily limited to the specific features or actions described. Additionally, the source code and headers shown on Appendix A on the CD-ROM filed herewith do not limit the specific features or actions described but are incorporated herein by reference. Rather, the specific features and operations of data encryption and data communication are disclosed as exemplary forms of implementing the claimed subject matter.

The invention claimed is:

1. A computer-implemented method for accelerating stream cipher encryption operations, the computer-implemented method comprising:
    receiving data;
    separating the data into a plurality of file chunks;
    compressing each file chunk to generate a plurality of compressed file chunks;
    associating a respective compression-encryption instructions header with each compressed file chunk to generate a plurality of compressed chunks;
    encrypting each compressed file chunk to generate a plurality of compressed-encrypted chunks without encrypting the header associated with each compressed file chunk;
    merging each of the compressed-encrypted chunks to produce a final encrypted-compressed-merged file;
    encrypting each compressed file chunk according to a set of instructions in the respective compression-encryption instructions header; and
    associating a second encryption header with to the compressed-encrypted chunk to denote that it has been encrypted according to a particular modified scheme.

2. The computer-implemented method of claim 1 wherein compressing further comprises operations for applying Huffman coding to generate the compressed file chunks.

3. The computer-implemented method of claim 1 wherein the instructions direct compression of each compressed file chunk without encrypting or removing corresponding data encryption instructions.

4. The computer-implemented method of claim 1 wherein each compressed-encrypted chunk includes a respective unencrypted compression-encryption header.

5. The computer-implemented method of claim 1 wherein encrypting further comprises applying a stream cipher algorithm to encrypt each compressed file chunk.

6. The computer-implemented method of claim 1 wherein encrypting further comprises applying an RC4 algorithm to encrypt each compressed file chunk.

7. The computer-implemented method of claim 1 wherein encrypting further comprises communicating each compressed chunk to a respected assigned worker node of a plurality of worker nodes in a grid system to generate a corresponding plurality of compressed-encrypted chunks according to a set of instructions in a respective compression-encryption instructions header, each compressed-encrypted chunk comprising a second encryption header to denote that it has been encrypted according to a modified scheme; and
    the computer-implemented method further comprises receiving respective ones of the compressed-encrypted chunks from respective ones of the worker nodes.

8. A computing device for accelerated stream cipher encryption operations, the computing device comprising:
    a processor; and
    a memory operatively coupled to the processor, the memory comprising computer-program instructions executable by the processor to perform operations comprising:
        receiving data;
        separating the data into a plurality of file chunks;
        compressing each file chunk to generate a plurality of compressed file chunks;

associating a respective compression-encryption instructions header with each compressed file chunk to generate a plurality of compressed chunks;

merging each of the compressed-encrypted chunks to produce a final encrypted-compressed-merged file without encrypting the header associated with each compressed file chunk;

encrypting each compressed file chunk according to a set of instructions in the respective compression-encryption instructions header; and associating a second encryption header with to the compressed-encrypted chunk to denote that it has been encrypted according to a modified scheme.

9. The computing device of claim 8 wherein compressing further comprises operating for applying Huffman coding to generate the compressed file chunks.

10. The computing device of claim 8 wherein each compressed-encrypted chunk includes a respective unencrypted compression-encryption header.

11. The computing device of claim 8 wherein
encrypting further comprises operations for communicating each compressed chunk to a respective assigned worker node of a plurality of worker nodes in a grid system to generate a corresponding plurality of compressed-encrypted chunks according to a set of instructions in the respective compression-encryption instructions header, each compressed-encrypted chunk comprising a second encryption header to denote that it has been encrypted according to a modified scheme; and
the computer-program instructions further comprise instructions for receiving respective ones of the compressed-encrypted chunks from respective ones of the worker nodes.

12. A computer-implemented method for accelerating stream cipher encryption operations, the computer-implemented method comprising:
receiving data;
separating the data into a plurality of file chunks;
compressing each file chunk to generate a plurality of compressed file chunks;
associating a respective compression-encryption instructions header with each compressed file chunk to generate a plurality of compressed chunks;
encrypting each compressed file chunk to generate a plurality of compressed-encrypted chunks, wherein the encrypting further comprises:
encrypting each compressed file chunk according to a set of instructions in the respective compression-encryption instructions header; and
associating a second encryption header with to the compressed-encrypted chunk to denote that it has been encrypted according to a particular modified scheme; and
merging each of the compressed-encrypted chunks to produce a final encrypted-compressed-merged file.

13. A computing device for accelerated stream cipher encryption operations, the computing device comprising:
a processor; and
a memory operatively coupled to the processor, the memory comprising computer-program instructions executable by the processor to perform operations comprising:
receiving data;
separating the data into a plurality of file chunks;
compressing each file chunk to generate a plurality of compressed file chunks;
associating a respective compression-encryption instructions header with each compressed file chunk to generate a plurality of compressed chunks; and
merging each of the compressed-encrypted chunks to produce a final encrypted-compressed-merged file, wherein encrypting further comprises operations for:
encrypting each compressed file chunk according to a set of instructions in the respective compression-encryption instructions header; and
associating a second encryption header with to the compressed-encrypted chunk to denote that it has been encrypted according to a modified scheme.

14. The computer-implemented method of claim 12 wherein compressing further comprises operations for applying Huffman coding to generate the compressed file chunks.

15. The computer-implemented method of claim 12 wherein the instructions direct compression of each compressed file chunk without encrypting or removing corresponding data encryption instructions.

16. The computer-implemented method of claim 12 wherein each compressed-encrypted chunk includes a respective unencrypted compression-encryption header.

17. The computer-implemented method of claim 12 wherein encrypting further comprises applying a stream cipher algorithm to encrypt each compressed file chunk.

18. The computer-implemented method of claim 12 wherein encrypting further comprises applying an RC4 algorithm to encrypt each compressed file chunk.

19. The computer-implemented method of claim 12 wherein
encrypting further comprises communicating each compressed chunk to a respected assigned worker node of a plurality of worker nodes in a grid system to generate a corresponding plurality of compressed-encrypted chunks according to a set of instructions in a respective compression-encryption instructions header, each compressed-encrypted chunk comprising a second encryption header to denote that it has been encrypted according to a modified scheme; and
the computer-implemented method further comprises receiving respective ones of the compressed-encrypted chunks from respective ones of the worker nodes.

20. The computing device of claim 13 wherein compressing further comprises operating for applying Huffman coding to generate the compressed file chunks.

21. The computing device of claim 13 wherein each compressed-encrypted chunk includes a respective unencrypted compression-encryption header.

22. The computing device of claim 13 wherein
encrypting further comprises operations for communicating each compressed chunk to a respective assigned worker node of a plurality of worker nodes in a grid system to generate a corresponding plurality of compressed-encrypted chunks according to a set of instructions in the respective compression-encryption instructions header, each compressed-encrypted chunk comprising a second encryption header to denote that it has been encrypted according to a modified scheme; and
the computer-program instructions further comprise instructions for receiving respective ones of the compressed-encrypted chunks from respective ones of the worker nodes.

* * * * *